United States Patent
Schuelke et al.

(10) Patent No.: US 9,543,686 B2
(45) Date of Patent: Jan. 10, 2017

(54) CONTACT ELEMENT FOR MECHANICALLY, THERMALLY AND ELECTRICALLY CONTACTING AN ENERGY STORE

(75) Inventors: Armin Schuelke, Rutesheim-Heuweg (DE); Arpad Imre, Vaihingen (DE); Niko Dorsch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 14/129,456

(22) PCT Filed: May 11, 2012

(86) PCT No.: PCT/EP2012/058711
§ 371 (c)(1),
(2), (4) Date: Mar. 27, 2014

(87) PCT Pub. No.: WO2013/000617
PCT Pub. Date: Jan. 3, 2013

(65) Prior Publication Data
US 2014/0199880 A1    Jul. 17, 2014

(30) Foreign Application Priority Data
Jun. 28, 2011 (DE) .......... 10 2011 078 235

(51) Int. Cl.
*H01R 13/46* (2006.01)
*H01M 2/10* (2006.01)
(Continued)

(52) U.S. Cl.
CPC .......... *H01R 13/46* (2013.01); *H01M 2/1072* (2013.01); *H01M 2/1077* (2013.01);
(Continued)

(58) Field of Classification Search
CPC  H01M 2/1072; H01M 2/1077; H01M 2/1094; H01M 2/202; H01M 10/613; H01M 10/615; H01M 10/6556; H01M 10/655; H01M 10/0525; H01R 13/46; Y02T 10/7011
See application file for complete search history.

(56) References Cited

U.S. PATENT DOCUMENTS

2001/0031392 A1* 10/2001 Ogata ................. H01M 2/1016
429/99
2003/0017384 A1* 1/2003 Marukawa .......... H01M 2/1077
429/120

(Continued)

FOREIGN PATENT DOCUMENTS

CN    201804938 U    4/2011
DE    10 2007 020295    11/2008
(Continued)

OTHER PUBLICATIONS

International Search Report for PCT/EP2012/058711, dated Jul. 11, 2012.

*Primary Examiner* — Muhammad Siddiquee
(74) *Attorney, Agent, or Firm* — Norton Rose Fulbright US LLP; Gerard Messina

(57) ABSTRACT

A contact element for mechanically, thermally and electrically contacting at least one energy store at least partially delimits at least one accommodating space for accommodating the at least one energy store. The contact element is designed for a force-fit, form-locked and/or integral joint with at least one subarea of the energy store, the contact element being at least partially electrically conductive, and the contact element being at least partially thermally conductive.

24 Claims, 2 Drawing Sheets

(51) Int. Cl.

| | | |
|---|---|---|
| *H01M 2/20* | (2006.01) | |
| *H01M 10/615* | (2014.01) | |
| *H01M 10/6556* | (2014.01) | |
| *H01M 10/655* | (2014.01) | |
| *H01M 10/613* | (2014.01) | |
| *H01M 10/0525* | (2010.01) | |

(52) U.S. Cl.
CPC ......... *H01M 2/1094* (2013.01); *H01M 2/202* (2013.01); *H01M 10/613* (2015.04); *H01M 10/615* (2015.04); *H01M 10/655* (2015.04); *H01M 10/6556* (2015.04); *H01M 10/0525* (2013.01)

(56) References Cited

U.S. PATENT DOCUMENTS

| | | | | |
|---|---|---|---|---|
| 2008/0124627 A1* | 5/2008 | Shimoyama | ........ | H01M 2/1077 429/186 |
| 2009/0325049 A1* | 12/2009 | Niedzwiecki | ....... | H01M 2/0245 429/100 |
| 2012/0224326 A1* | 9/2012 | Kohlberger | ......... | H01M 2/1077 361/699 |

FOREIGN PATENT DOCUMENTS

| | | |
|---|---|---|
| DE | 10 2008 044169 | 6/2010 |
| DE | 10 2009 040197 | 3/2011 |
| JP | 2001-297740 | 10/2001 |
| WO | 2011036172 A1 | 3/2011 |

\* cited by examiner

CONTACT ELEMENT FOR MECHANICALLY, THERMALLY AND ELECTRICALLY CONTACTING AN ENERGY STORE

BACKGROUND OF THE INVENTION

1. Field of the Invention

The present invention relates to a contact element for mechanically, thermally and electrically contacting at least one energy store. The present invention further relates to an energy store module including the contact element.

2. Description of the Related Art

At present, hybrid electric or all-electric drive concepts are being developed to a greater extent to reduce emissions, such as the local emission of motor vehicles. The operation of electric machines in motor and generator mode presupposes an electrical energy store in the vehicle. The relatively high piece costs of a so-called traction battery in a vehicle make it desirable for a service life of the energy stores or of the cells to be within the scope of the vehicle service life.

Traction batteries typically include a few to several thousand individual cells which are interconnected in parallel or serial branches in such a way that the specification with respect to the operating range, i.e., the charge capacity of the entire traction battery, and the maximum power, i.e., the maximum load current per cell, are met. In practical embodiments, the cells are often assembled in compact modules. Such modules and their components should meet the requirements in terms of mechanical stability, thermic capacity and electrical contacting to ensure a long service life of the module, and thus of the entire traction battery.

BRIEF SUMMARY OF THE INVENTION

The present invention relates to a contact element for mechanically, thermally and electrically contacting at least one energy store, the contact element at least partially delimiting at least one accommodating space for accommodating the at least one energy store, the contact element being designed for a force-fit, form-locked and/or integral joint with at least one subarea of the energy store, the contact element being at least partially electrically conductive, and the contact element being at least partially thermally conductive.

Mechanical contacting within the meaning of the present invention may mean in particular mechanically attaching the at least one energy store to the contact element, which ensures secure retention, and thus the associated high stability, of the energy store, for example when used in a motor vehicle.

Thermal contacting within the meaning of the present invention may mean in particular bringing the contact element in contact with the energy store in such a way that the heat generated by the energy store during operation may be dissipated, in particular completely, via the contact element as a result of the thermal contacting of the contact element. Moreover, heat may similarly be supplied from a different source, whereby the energy store may be cooled or heated.

Electrical contacting within the meaning of the present invention may mean in particular electrically connecting the energy store to the contact element, and thus in particular moreover a potential electrical connection to an electrical system, for example a traction battery or a consumer. For this purpose, for example, a parallel or a serial interconnection of the at least one energy store with further energy stores is possible.

An energy store within the scope of the present invention may be any element which is able to store energy, in particular electrical energy, and make it available to a consumer. The at least one energy store particularly preferably includes or is an individual cell of a traction battery, or an individual cell of a rechargeable battery.

According to the present invention, the contact element at least partially delimits at least one accommodating space for accommodating the energy store. This may be implemented, for example, by only one area of the contact element which completely or partially delimits the accommodating space. Moreover, multiple areas may be provided, which each partially delimit the accommodating space.

The contact element is designed for a force-fit, form-locked and/or integral joint with at least one subarea of an energy store for the purpose of mechanical contacting. The contact element is further at least partially electrically conductive for the purpose of electrical contacting. Moreover, the contact element is at least partially thermally conductive for the purpose of thermal contacting. Each of the above-mentioned properties may be assigned to an individual separate area of the contact element, in the case that multiple such areas are provided. As an alternative, only one area, or each of the areas, or the entire contact element itself may have all or multiple of the above-mentioned properties. In the event that only one area is provided for the above-mentioned tasks, this area has each of the above-mentioned properties.

A design for a force-fit joint may mean within the scope of the present invention in particular that the contact element is at least partially oriented or designed in a suitable manner to develop a clamping action. For this purpose, for example, the contact element may extend partially, such as through a suitable clamping area, essentially parallel to at least one subarea of an outside wall of the energy store. This may mean in particular that an exact parallel orientation or a slanted orientation may be provided. A slanted orientation may be advantageous in particular when no energy store is attached to, i.e., contacted with, the contact element since in this case a pretensioning in particular in the accommodating space may be advantageous. The degree of the slant or pretensioning is in particular dependent on the shape and size of the energy store to be contacted and on the desired clamping force.

A design for an integral joint may mean in particular that a suitable area of the contact element, for example a side leg of the same, may extend in parallel to an outside wall of the energy store; however, it does not necessarily have to be pretensioned, to create a clamped joint. Rather, the mechanical contacting may take place with the aid of a suitable adhesive, for example, which is able to hold the two components together as a result of their orientation, and which may be situated on the contact element.

A design for a form-locked joint may mean within the scope of the present invention in particular that the contact element has a section which may engage behind a portion of the energy store, for example, in order to thus attach or mechanically contact the same.

The contact element is further used for thermal contacting. The element may be suitable to absorb and dissipate heat from the energy store, in particular as a result of direct contact with the at least one energy store or a portion of the same. It may be advantageous for this purpose if a contact surface between the contact element, or an area of the same, and the energy store has a size in a range of ≥10%, in particular ≥20%, of a surface of the energy store, such as a lateral surface of the energy store. In this way a particularly large contact surface is present, which in addition to a good force fit may also ensure particularly advantageous heat transfer. Such a surface may further be taken up by multiple areas of the contact element, in particular a coverage or thermal contacting of the energy store of ≥10% or ≥30%, relative to the total outside surface of the at least one energy store, being advantageous. It may be advantageous for this purpose in particular if the contact element is at least partially thermally conductive.

As described above, it is possible that one or multiple areas of the contact element responsible for the thermal contacting is/are used only to a limited extent for the mechanical contacting or act in this regard. In addition to one or multiple areas of the contact element having a large dimension, as described above, for example additional areas may be provided, which assume a majority of or the entire mechanical contacting as a result of their orientation or pretensioning. These areas may be dimensioned considerably smaller in this case and transmit only a comparatively small portion of thermal energy.

Moreover, the contact element is used for electrical contacting. If the contact element is at least partially electrically conductive, this contacting may already be achieved by a mere contact between the contact element and the energy store or, for example, its housing connected to ground. Moreover, electrical connections may be formed between the contact element and the corresponding pole of the energy store. Depending on the electrical interconnection, i.e., in particular a serial or parallel interconnection, and cell geometry, the electrical contacting may take place with the aid of additional links or contact means of the contact element which are specifically provided for this purpose. For example, contacting may be ensured with the aid of welding, soldering, pressing, crimping, bonding or other force-fitting, form-locking or integral methods, in this case it being possible similarly to implement mechanical contacting.

The contact element according to the present invention thus allows complete mechanical, thermal and electrical at least single-pole or top-side contacting of at least one energy store with only one component or one contact element. This is made possible since the contact element according to the present invention provides thermal, mechanical and electrical interfaces, so that additional or parallel thermal, mechanical and electrical contacting or connection is not necessary. According to the present invention, it is thus no longer necessary, at least for in particular complete single-pole or top-side mechanical, thermal and electrical contacting, to provide multiple contact elements or components for contacting the energy store, as is customary in the related art.

In this way, the number of components, for example of a traction battery, may be considerably decreased, which reduces the system weight, for example. According to the present invention, moreover the material used, or the components used, have multiple benefits, which allows a high degree of integration of the battery components.

Another positive aspect of the contact element according to the present invention is further that current-conducting components are cooled since the same element which is used for electrical contacting is also used for heat dissipation. As a result, the cross section of current conductors may be reduced, which also saves material, and thus weight, as well as costs.

Since the mechanical contacting according to the present invention may take place in particular with the aid of a clamping action of one or multiple areas of the contact element, between which the at least one energy store is inserted and clamped, a purely force-fit joint may be formed between the energy store and the contact element. Such a joint may be easily formed and is easy to detach again. The assembly complexity when attaching an energy store to the contact element may thus be kept low, which saves time and costs when manufacturing a traction battery, for example. It is further also easily possible to replace an energy store, for example, in the event that it has a defect. As a result, this additionally simplifies the recycling of a traction battery.

Within the scope of one embodiment of the present invention, the contact element has a head section, on which at least one side leg is situated. Within the scope of the present invention, this may mean in particular the provision of at least one leg which is designed in one piece with the head section or is attached to the head section. For example, a side leg may be provided, which approximately at least partially delimits a round or rectangularly shaped accommodating space, as a function of the design of the energy store to be contacted.

However, in particular at least two side legs may be provided, which are situated opposite each other on the head section. Situated opposite each other may mean in particular that they define an accommodating space situated between them, into which an energy store is introducible. Similarly to the at least one side leg, the head section may be a contacting area of the contact element and may thus also be used for mechanical and/or thermal and/or electrical contacting. The head section may in particular be used for mechanical contacting.

Moreover, the at least one side leg may be situated essentially perpendicularly to the head section. Within the scope of the present invention this may mean in particular that the at least one side leg extends at exactly a right angle, or encloses a particular angle, for example to implement a pretensioning. In this case, the right-angled orientation may be achieved for the case that an energy store is contacted by the contact element.

Moreover, it may be advantageous that the at least one side leg extends at a slant. This may be suitable in particular for the case where, for example, the head area of the energy store does not extend exactly in parallel, but thickens toward the top, for example, whereby the mechanical contacting may be improved. In this case, the at least one side leg may also be oriented, for example, at an angle of 45° into the accommodating space for the event that an energy store is contacted.

Within the scope of one further embodiment of the present invention, the contact element has at least one heat transfer means, in particular a heating-cooling channel, for dissipating or supplying heat from or to the contact element. A heat transfer means for dissipating or supplying heat within the meaning of the present invention may include any element which serves the purpose of dissipating heat of the at least one energy store which is absorbed by the contact element or supplying heat to the same. This includes both a direct dissipation of heat and indirect dissipation, for example with the aid of further elements or components.

In particular when using a heating-cooling channel, such as a cooling channel or a heating channel, the heat of the energy store absorbed by the contact element may be given off in a simple manner to the heating-cooling channel, or to a temperature control medium situated in the heating-cooling channel. It is advantageous for this purpose that the heating-cooling channel has a low thermal insulation level to be able to transmit heat well. Suitable heating-cooling channels may thus be made of metal, in this case suitable electrical insulation being providable at the necessary locations to prevent a short circuit. Moreover, plastic materials, in particular having ceramic fillers, are advantageous since these may be electrically insulating and thermally have good heat conducting properties. The exact design and dimensioning are to be selected in particular as a function of the necessary temperature control action to be generated.

For example, one or a plurality of attachment means may be provided on the contact element to attach a heating-cooling channel to the outside of the contact element. As an alternative or in addition, it may further be advantageous that the at least one heat transfer means has a heating-cooling channel situated on the inside of the contact element. In this specific embodiment, the heat absorbed by the contact element may be dissipated directly from its inside or supplied to the inside. The number and size of the heating-cooling channels are again in particular dependent on the necessary cooling action or heating action to be generated. Advantageously, an electrically non-conductive coolant is suitable as a cooling or heating agent which may flow through the heating-cooling channel. For example, organic oils or also deionized water may be used.

Within the scope of one further embodiment of the present invention, the contact element has a detent element for attaching the at least one energy store. The mechanical contacting may thus be improved further. The mechanical contacting is thus not only caused by a clamping effect, for example, but may further be enhanced by the detent connection or exclusively brought about by the same. In this specific embodiment, particularly stable mechanical contacting is thus possible. An advantageous aspect of a detent connection is further that such a mechanical fixation represents an easily detachable joint, whereby a mechanical contacting may be easily detached, for example to replace an energy store.

The present invention further relates to an energy store module having at least one energy store and a contact element according to the present invention, on which the at least one energy store is mechanically, thermally and electrically contacted, further including a base element for the base-side contacting of the at least one energy store. The energy store module according to the present invention thus includes at least one energy store; however, it is preferably equipped with a majority of energy stores. For example, the energy store module according to the present invention may have a unit of four battery cells or rechargeable battery cells, which may be connected in parallel, for example. The base element may be used in particular for the base-side contacting of the at least one energy store. Base-side contacting may mean in particular mechanical contacting, such as a stabilization of the energy store or energy stores, or of the energy store module, as well as electrical contacting of the energy store or energy stores. It is understood by those skilled in the art that the base-side electrical contacting refers in particular to the contacting of the counterpole with respect to the pole of the energy store which was contacted by the contact element.

The contact element according to the present invention may further preferably be designed for mechanically, thermally and electrically contacting the at least one energy store, or preferably all of a majority of energy stores. For this purpose, the contact element, for example in the case of cuboid-shaped energy stores, may preferably have a continuous head section and, for example, at least one side leg, which is designed as described above, for each of the energy stores. The heat transfer means for dissipating heat may be provided for each of the energy stores or be situated in such a way that it absorbs all of the heat which the contact element absorbs from the energy store or the energy stores, or gives it off to the same.

The energy store module according to the present invention in particular has the advantages discussed with respect to the contact element. By providing the contact element according to the present invention, the energy store or the energy stores may be mechanically, thermally and electrically contacted by the contact element. As a result, the assembly complexity and the disassembly complexity may be considerably reduced, which saves time and costs and simplifies maintenance. Moreover, weight and costs may be saved as a result of a reduction of the components.

Within the scope of one specific embodiment of the energy store module according to the present invention, a heat transfer medium is situated between the at least one energy store and the contact element. The heat transfer medium is advantageously a heat transfer medium which is not electrically conductive per se, such as a heat transfer gel. In this way, the thermal connection of the energy store to the contact element may be improved even further.

Within the scope of one further specific embodiment of the energy store module according to the present invention, the at least one energy store is a rechargeable lithium ion battery. Such an energy store has a plurality of advantages since it is usually thermally stable and has no memory effect. Moreover, a rechargeable lithium ion battery is characterized by a comparatively high energy density.

It may further be advantageous if at least two energy stores are provided, between which at least one vibration damping element is situated. On the one hand, a vibration damping element may improve the stability of the energy store module. If multiple energy stores are present, these are preferably not situated directly next to each other, but rather a gap is provided between the energy stores to prevent an electrical contact of the electrically conducting energy store housings, for example, and further to allow cooling.

However, in the case of vibrations, as they may occur during a use of the energy store module according to the present invention in a vehicle, for example, the stability of the module may be impaired after an extended period of use. To prevent this, at least one vibration damping element is provided between the energy stores in this specific embodiment. The at least one vibration damping element is preferably elastic and electrically non-conducting. For example, one or a plurality of rubber buffers or elastomer films may be used, or a suitable foam may be introduced between the energy stores. Moreover, plastic components may be situated between the energy stores to damp vibrations. An energy store module according to this specific embodiment is thus particularly stable and durable. The at least one vibration damping element should be designed in such a way that it is also stable at high temperatures, i.e., also withstands a potential thermal runaway of the energy store.

The present invention further relates to an energy store system including at least two energy store modules according to the present invention. In an energy store system according to the present invention, two or multiple energy store modules may be connected in parallel or in series to meet the requirements of the energy store system with respect to maximum charge capacity of the entire system, such as that of a traction battery, and of the maximum power. An energy store system according to the present invention in particular has the advantages described with respect to the contact element according to the present invention and those described with respect to the energy store module, namely in particular easy assembly and disassembly, a reduction of the required components, and an associated reduction of the costs.

Within the scope of one specific embodiment of the energy store system according to the present invention, electrical insulation is situated between the at least two energy store modules. In this way, an electrical contact between the individual modules, or the energy stores situated in the modules, may be prevented. The modules may nonetheless be installed very close to each other, which saves installation space. This is advantageous in particular in mobile applications, such as in vehicles, for example motor vehicles. The electrical insulation should be designed in such a way that it is also stable at high temperatures, i.e., also withstands a potential thermal runaway of the energy store.

Further advantages and advantageous embodiments of the subject matters according to the present invention are illustrated in the drawings and described in the following description. It should be noted that the drawings are only of a descriptive nature and are not intended to limit the present invention in any way.

DETAILED DESCRIPTION OF THE INVENTION

Figure 1:
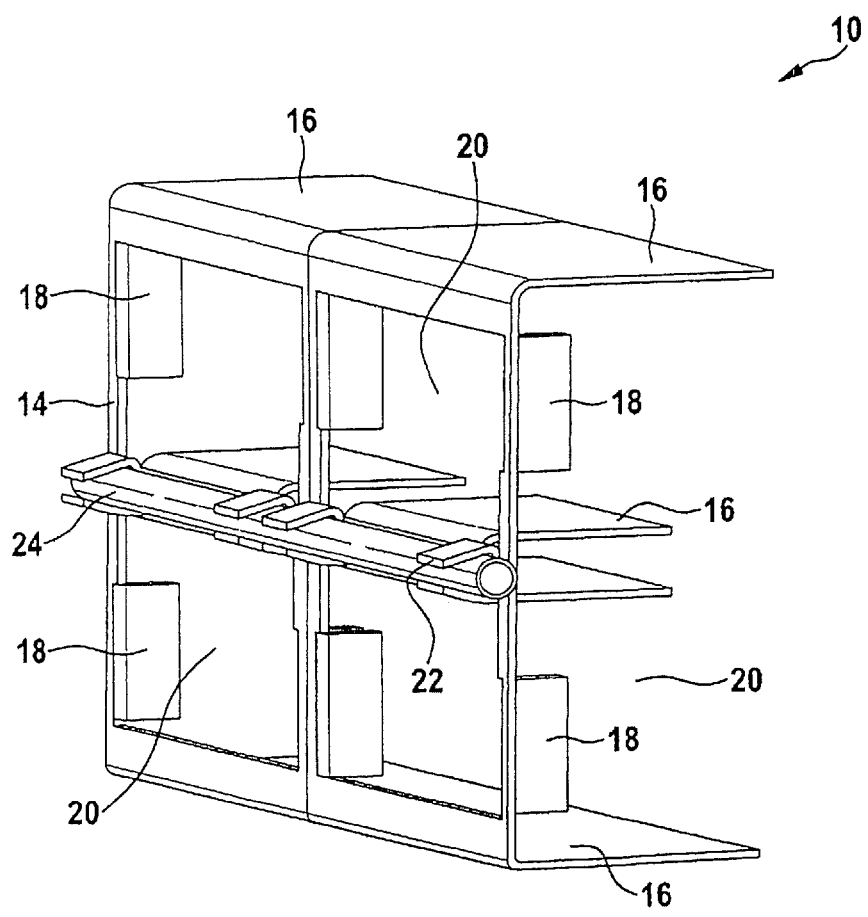
FIG. 1 shows a schematic sketch of one specific embodiment of a contact element according to the present invention.
Figure 2:
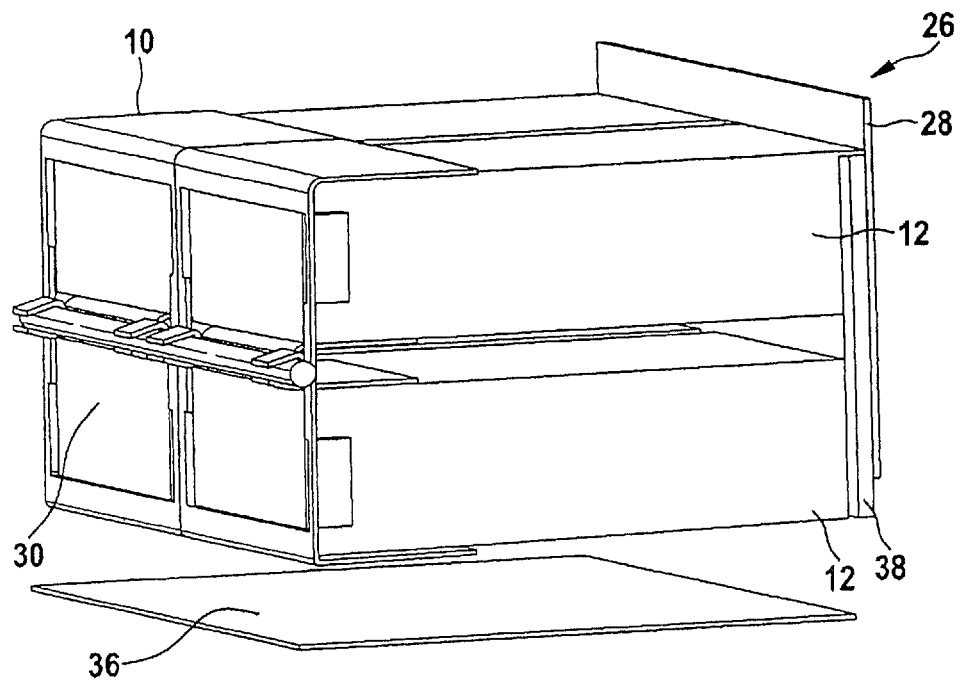
FIG. 2 shows a schematic sketch obliquely from above of one specific embodiment of an energy store module according to the present invention.
Figure 3:
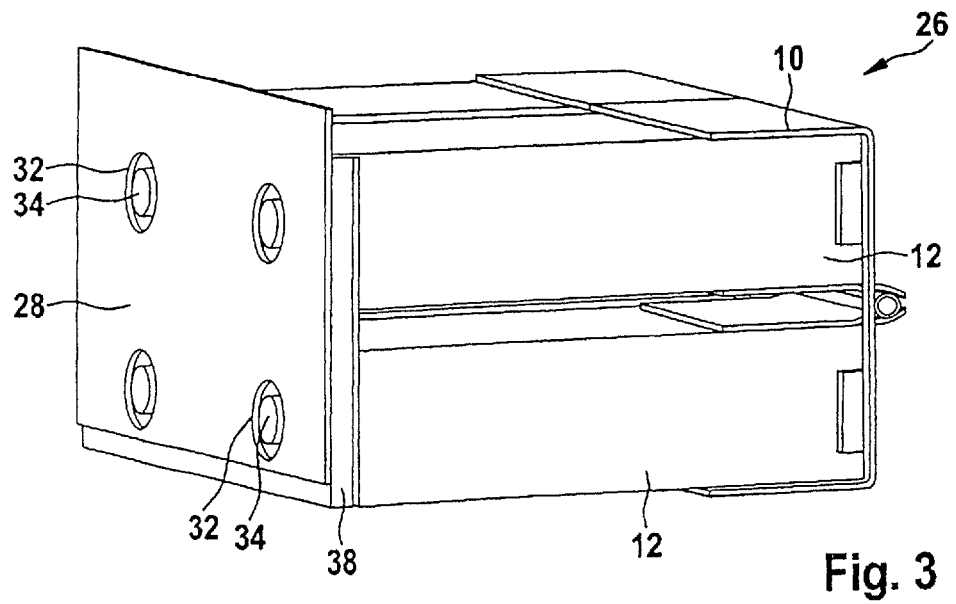
FIG. 3 shows a schematic sketch obliquely from beneath the specific embodiment of the energy store module of FIG. 2.

FIG. 1 shows one specific embodiment of a contact element 10 according to the present invention. Contact element 10 is used to mechanically, thermally and electrically contact at least one energy store 12, which is not shown in FIG. 1. The positioning of energy store 12 in contact element 10 and the contacting of energy store 12 by contact element 10 are shown in FIGS. 2 and 3.

Contact element 10 according to the present invention may be designed in one piece or in multiple pieces, for example. Contact element 10 is particularly preferably made in one piece from a metal, such as a metal sheet, for example made of copper. It may be stamped or folded into a suitable shape.

Contact element 10 according to FIG. 1 is designed to accommodate or contact at least one energy store 12. It delimits at least one accommodating space 20 for at least partially accommodating the at least one energy store 12. In the case of an energy store 12 having a round cross section, for example, only one area of the contact element may be provided, which forms a circular accommodating space 20. However, without limiting the present invention, according to FIG. 1 contact element 10 is designed to contact four energy stores 12, which still have a cuboid shape. Contact element 10 according to FIG. 1 consequently delimits four accommodating spaces 20 at least partially.

Contact element 10 is designed for a force-fit, form-locked and/or integral joint with at least one subarea of energy store 12. Contact element 10 is also at least partially electrically conductive and additionally at least partially thermally conductive.

According to FIG. 1, the contact element may have a head section 14, which may be used for the upper rest of an energy store 12 or of multiple energy stores 12. According to FIG. 1, head section 14 is designed for four energy stores 12 to rest against. In addition to head section 14, contact element 10 may have one or multiple additional area(s), for example at least one or two side legs 16. These may be situated opposite each other on head section 14. The, for example, at least two side legs 16 may be used for a force-fit, integral and/or form-locked fixation of energy store 12, i.e., for its mechanical contacting. For this purpose, at least two side legs 16 which are situated opposite each other may be present for each energy store 12, so that the at least one energy store 12 is introducible between side legs 16. Since according to FIG. 1 contact element 10 is designed to contact four energy stores 12, preferably two side legs 16 may be provided for each of energy stores 12. It is possible in principle that two energy stores 12 are situated directly next to each other in such a way that they share side leg 16 situated between them. In this case, an electrical insulator may be situated between energy stores 12 to prevent a short circuit. However, it is preferred that, as is shown in FIG. 1, at least two side legs 16 are provided for each energy store 12.

Side legs 16 may be oriented at a right angle with respect to head section 14 in a design for a force-fit joint with at least one subarea of an energy store 12. However, by deviating from the rectangular shape, they may also be pretensioned by being bent inward, i.e., toward each other, and being directed into accommodating space 20. Generally, the orientation and shape of side legs 16 may preferably be selected as a function of the shape of energy store or energy stores 12, for example to achieve a sufficient force fit, and thus the desired mechanical contacting.

For the case that side legs 16, or at least one side leg 16, is or are used for thermal contacting in addition to mechanical contacting, it is at least partially thermally conductive. This area may be used to dissipate the heat absorbed by contact element 10 with the aid of air or liquid cooling or direct evaporation. In addition to an at least partial thermal conductivity, a large contact surface between side leg 16 and energy store 12 is helpful for this purpose. For example, the area of the contact element which is used for thermal contacting may have a size which corresponds to $\geq 10\%$, or even $\geq 20\%$, for example, of a lateral surface of energy store 12. Overall, it may be advantageous if $\geq 10\%$, or even $\geq 30\%$, of the entire surface of the energy store is contacted or covered by one area or multiple areas of the contact element.

Moreover, contact element 10 may have at least one heat transfer means for dissipating heat from contact element 10, or for supplying heat to contact element 10. According to FIG. 1, an attachment means 22 for attaching a heating-cooling channel 24 is provided, which is situated on the outer side of contact element 10. In this way, the heat absorbed by contact element 10 may be dissipated in a simple manner, for example. In addition or as an alternative, for example, a heating-cooling channel may be situated on the inside of contact element 10. In general, particularly effective cooling or heating of contact element 10 may be achieved with the aid of a heating-cooling channel 24. Heating-cooling channel or channels 24 may extend in or on head section 14, for example, or also in or on side legs 16, and generally have a meander design, for example.

In addition to the areas of the contact element which are designed as side legs 16, for example, additionally or alternatively further areas of contact element 10 may be provided, which are also designed as side legs 18, for example. These may be dimensioned smaller than side legs 16. In addition to low thermal contacting, side legs 18 may be used in particular for mechanical and/or electrical contacting. In cooperation with head element 14 and side legs 16, they may define accommodating space 20 for energy store or energy stores 12 and, for this purpose, may also be oriented as a function of the shape of energy store 12 to create a force fit.

As an alternative or in addition, contact element 10, and in particular side legs 16, 18, may be designed for a form-locked or integral joint. For an integral joint, an adhesive joint may be provided, for example. However, an adhesive which withstands the temperatures generated by energy store or energy stores 12 should be used, and it should also allow heat transfer or be applied only partially in order not to prevent heat transfer to contact element 10. As an alternative or in addition, a form-locked joint may be present. For this purpose, for example, a side leg 16, 18 may extend along the entire length of energy store 12 and have a section which engages behind the base area of energy store 12. As another option for forming a form-locked joint, contact element 10 may have a detent element for attaching the at least one energy store 12, for example on a side leg 16, 18.

FIG. 2 shows a schematic view of one specific embodiment of an energy store module 26 according to the present invention having at least one energy store 12, the module including at least one contact element 10 according to FIG. 1. According to this figure, energy store module 26 has four energy stores 12, for example lithium-ion cells or rechargeable lithium-ion batteries, which are thermally, mechanically and electrically contacted by contact element 10. Since contact element 10 corresponds to what has been described in FIG. 1, it is not described here in detail. Reference is made in this regard to the description of FIG. 1.

Energy store modules 26 according to the present invention may be employed in a plurality of mobile and stationary applications. For example, a use in an all electrically operated vehicle or a hybrid electric vehicle is advantageous.

As described above, energy stores 12 may be connected to contact element 10, for instance to side legs 16, 18 of contact element 10, with the aid of a force-fit, form-locked and/or integral joint.

Energy stores 12 may have a ground terminal, which is contactable with the aid of a contact between contact element 10, or an electrically conductive area of the same, for instance a side leg 16, 18, and the housing of energy store 12. In this way, an electrical contact may be created between contact element 10 and the ground terminal of energy store 12 by contacting in particular side legs 16, 18. A weld or the like may preferably be provided between the at least one energy store 12 and contact element 10 to achieve precisely defined electrical contacting.

Energy store module 26 may further include a base element 28, which is designed in particular for base-side contacting of the at least one energy store 12. By attaching an energy store or energy stores 12 to base element 28, the entire energy store module 26 may have a greater rigidity. This is apparent in particular from FIG. 3. Base element 28 preferably has openings 32 to electrically contact the further pole of energy store 12. In general, the ground terminal will be the (+)pole of energy store 12, while the (−)pole is contactable at the base of energy store 12 and is shown as terminal 34. According to FIG. 2, four energy stores 12 are each in turn contacted with terminal 34.

To increase the stability of energy store module 26, at least one vibration damping element, which is not shown, may also be situated between two energy stores 12. This element, made of plastic or rubber, for example, may stabilize the position of energy store 12 and make the entire energy store module 26 more durable. Moreover, the top sides of energy stores 12 may be electrically insulated by a suitable insulation 30, for example a plastic film.

A heat transfer medium may also be situated between the at least one energy store 12 and contact element 10 to improve the thermal contact.

Multiple energy store modules 26, such as in particular at least two, may also be connected to form an energy store system and may be suitably interconnected in parallel or in series, for example to form a traction battery for a vehicle. Similarly to each energy store 12, each energy store module 26 may be at least partially surrounded by an electrical insulator 36, 38, such as an insulating panel or an insulating film, for example, to prevent electrical spark-overs or short circuits. The size of electrical insulator 36 may be adapted to, or take on, the dimension of energy stores 12, or of energy store module 26. Insulator 38 may also only partially surround or frame an energy store module, for example. Consequently, an electrical insulation 36, 38 may be situated between the at least two energy store modules 26.

What is claimed is:

1. A contact element for mechanically, thermally and electrically contacting a plurality of individual battery cells, comprising:
   a structural body which at least partially defines each of a plurality of accommodating spaces, each of the accommodating spaces for accommodating only a single one of the individual battery cells,
   wherein the structural body is configured for a force-fit connection with at least one subarea of each of the battery cells, and
   wherein the structural body is at least partially electrically conductive and at least partially thermally conductive, and
   wherein the structural body has head sections for an upper rest of each of the battery cells and each of the head sections having at least one respective first side leg extending therefrom, each of the at least one respective first side legs being bent inward into one of the accommodation spaces.

2. The contact element as recited in claim 1, wherein the structural body has at least one heat transfer element in the form of a heating-and-cooling channel for dissipating heat from the structural body and supplying heat to the structural body.

3. The contact element as recited in claim 2, wherein the structural body has a detent element for attaching the battery cells.

4. An energy store module, comprising:
   a plurality of individual battery cells; and
   a contact element configured as a structural body which at least partially defines each of a plurality of accommodating spaces, each of the accommodating spaces for accommodating only a single one of the battery cells,
   wherein the structural body is configured for a force-fit connection with at least one subarea of each of the battery cells,
   wherein the structural body is at least partially electrically conductive and at least partially thermally conductive,
   wherein the at least one energy store is mechanically, thermally and electrically contacted on the structural body,
   wherein the structural body includes a base element for a base-side contacting of each of the battery cells, and wherein the structural body has head sections for an upper rest of each of the battery cells and each of the head sections having at least one respective first side leg extending therefrom, each of the at least one respective first side legs being bent inward into one of the accommodation spaces.

5. The energy store module as recited in claim 4, wherein a heat transfer medium is situated between the at least one energy store and the contact element.

6. The energy store module as recited in claim 5, wherein each of the battery cells is a rechargeable lithium-ion battery cell.

7. The energy store module as recited in claim 4, wherein at least one vibration damping element is situated between two adjacent ones of the battery cells.

8. The energy store module as recited in claim 5, wherein at least one vibration damping element is situated between two adjacent ones of the battery cells.

9. The energy store module as recited in claim 8, wherein an electrical insulation is situated between two adjacent ones of the battery cells.

10. A contact element for mechanically, thermally and electrically contacting a plurality of individual battery cells, comprising:
a structural body which at least partially defines each of a plurality of accommodating spaces, each of the accommodating spaces for accommodating only a single one of the battery cells,
wherein the structural body is configured for a force-fit connection with at least one subarea of each of the battery cells,
wherein the structural body is at least partially electrically conductive and at least partially thermally conductive,
wherein a heat transfer gel is situated between the battery cells and the contact element, and
wherein the structural body has head sections for an upper rest of each of the battery cells and each of the head sections having at least one respective first side leg extending therefrom, each of the at least one respective first side legs being bent inward into one of the accommodation spaces.

11. The contact element as recited in claim 10, wherein the contact element is made in one piece from a metal.

12. The contact element as recited in claim 10, wherein the at least one first side leg is used for the force fit each of the battery cells.

13. The contact element as recited in claim 10, wherein at least one respective second side leg extends from each of the head sections, the at least one second side leg being dimensioned smaller than the at least one side leg.

14. The contact element as recited in claim 13, wherein the at least one first side leg and the at least one second side leg are partially thermally conductive.

15. The contact element as recited in claim 10, wherein an adhesive joint is provided.

16. An energy store module, comprising:
a plurality of individual battery cells;
a contact element configured as a structural body which at least partially defines each of a plurality of accommodating spaces, each of the accommodating spaces for accommodating only one of the battery cells and
a base element for a base-side contacting of the battery cells;
wherein the structural body is configured for at least one of a force-fit connection with at least one subarea of each of the battery cells,
wherein the structural body is at least partially electrically conductive and at least partially thermally conductive,
wherein each of the battery cells is mechanically, thermally and electrically contacted on the structural body, and
wherein a heat transfer gel is situated between the battery cells and the contact element; and
wherein the structural body has head sections for an upper rest of each of the battery cells and each of the head sections having at least one respective first side leg extending therefrom, each of the at least one respective first side legs being bent inward into one of the accommodation spaces.

17. The energy store module as recited in claim 16, wherein the base element has openings.

18. The contact element as recited in claim 1, wherein each of the respective first side legs is used for the force-fit of one of the battery cells.

19. The contact element as recited in claim 4, wherein each of the respective first side legs is used for the force-fit of one of the battery cells.

20. The energy module as recited in claim 16, wherein each of the respective first side legs is used for the force-fit of one of the battery cells.

21. The contact element as recited in claim 1, wherein the structure body is made in one piece form a single sheet of metal.

22. The contact element as recited in claim 4, wherein the structural body is made in one piece from a single sheet of metal.

23. The contact element as recited in claim 10, wherein the structural body is made in one piece from a single sheet of metal.

24. The energy module as recited in claim 16, wherein the structural body is made in one piece from a single sheet of metal.

* * * * *